(12) United States Patent
Bowen et al.

(10) Patent No.: US 7,216,847 B2
(45) Date of Patent: May 15, 2007

(54) INSTALLATION TOOL

(75) Inventors: Peter Edward Bowen, St. Peters (AU); Simon Nicholas Pisoni, Exeter (AU)

(73) Assignee: S & P Technologies Pty. Ltd, South Australia (AU)

( * ) Notice: Subject to any disclaimer, the term of this patent is extended or adjusted under 35 U.S.C. 154(b) by 0 days.

(21) Appl. No.: 11/010,575

(22) Filed: Dec. 14, 2004

(65) Prior Publication Data

US 2005/0155195 A1 Jul. 21, 2005

Related U.S. Application Data

(63) Continuation of application No. PCT/AU03/00736, filed on Jun. 13, 2003.

(30) Foreign Application Priority Data

Jun. 14, 2002 (AU) .................................. PS2931
Dec. 17, 2002 (AU) .............................. 2002953372

(51) Int. Cl.
*E21C 29/16* (2006.01)
(52) U.S. Cl. ............................................ 254/134.3 FT
(58) Field of Classification Search ....... 254/134.3 FT, 254/134.3 R
See application file for complete search history.

(56) References Cited

U.S. PATENT DOCUMENTS

| 3,078,073 A | 2/1963 | Zizzo |
| 3,182,960 A | 5/1965 | French |
| 3,582,123 A | 6/1971 | Smith et al. |
| 3,924,115 A | 12/1975 | Hampton et al. |
| 3,971,543 A | 7/1976 | Shanahan |
| 4,039,142 A | 8/1977 | Smith |
| 4,253,697 A | 3/1981 | Acosta |
| 4,467,514 A | 8/1984 | Dahlke |
| 4,527,775 A | 7/1985 | Flowers |
| 4,572,561 A | 2/1986 | Hale |
| 4,854,546 A | 8/1989 | Vea |
| 5,014,709 A * | 5/1991 | Bjelkhagen et al. ......... 600/431 |
| 5,458,317 A | 10/1995 | Caracofe et al. |
| 5,522,630 A | 6/1996 | James |
| 5,647,623 A * | 7/1997 | Shiao ........................ 294/65.5 |
| 5,887,855 A | 3/1999 | Whitney et al. |
| 5,915,770 A | 6/1999 | Bergstrom |

(Continued)

FOREIGN PATENT DOCUMENTS

AU 19995280 B2 3/2000

(Continued)

*Primary Examiner*—Robert C. Watson
(74) *Attorney, Agent, or Firm*—Blank Rome LLP (57) ABSTRACT

A tool is disclosed for installing an object into a cavity region. The tool includes an identifying means for providing a visual indication of an entry point for lowering the object into the cavity region. The entry point is relative to an opening in the cavity region. The tool also includes a capturing means for capturing the object after the object has been lowered into the cavity region from the entry point so as to allow the object to be retracted through the opening. The tool has a body which carries the identifying means and the capturing means. Part of the body is arranged so as to allow at least the identifying means and the capturing means to be inserted into the cavity region through the opening.

28 Claims, 9 Drawing Sheets

U.S. PATENT DOCUMENTS 5,957,399 A  9/1999  Siana, Jr.
6,279,877 B1  8/2001  Davis
6,318,704 B1  11/2001  Christenson
6,499,778 B2  12/2002  Boulay

FOREIGN PATENT DOCUMENTS

| | | |
|---|---|---|
| AU | 199952580 A1 | 3/2000 |
| CA | 2 311 723 | 1/2001 |
| GB | 2 264 200 | 8/1993 |
| GB | 2264200 A | 8/1993 |
| WO | WO 97/41626 | 6/1997 |
| WO | WO 97/41626 | 11/1997 |

\* cited by examiner

INSTALLATION TOOL

Continuation of prior PCT application No. PCT/AU03/00736 (WO 03/107503), filed Jun. 13, 2003, which claims priority to Australian PS2931, filed Jun. 14, 2002 and Australian 2002953372, filed Dec. 17, 2002.

FIELD OF INVENTION

The present invention broadly relates to a tool. The invention relates particularly but not exclusively to a tool for installing cables (for example, power and/or data cables) which are routed through a wall cavity.

BACKGROUND OF THE INVENTION

The installation of an electrical fitting (such as a power point) onto a wall typically includes routing an electrical cable to the fitting. This involves making a relatively small opening in the wall adjacent to where the fitting is to be mounted (at the first location) and subsequently passing a length of cable down the wall cavity and through the opening. Typically, a length of stiff plastic or other suitable material is attached to the end of the cable and it is this length of material that is initially passed into the cavity.

The cable is passed down the wall cavity from a second location, typically the roof space. It is generally quite difficult to determine with accuracy the location of the opening when the cable installer (typically an electrician) is positioned within the roof space. Accordingly, the installer estimates the likely position of the opening using measurements and constructional identifiers (such as uprights and pillars) and then passes the cable through the cavity.

As will be appreciated by those skilled in the art, to enable the end of the cable to be accessed from the opening, it is important that the cable (or weighted draw string) be fed into the wall cavity at an entry point which is more or less directly above the opening. It is also important that the cable end be lowered to a suitable height.

In some situations, where access to the top of the wall cavity is restricted, it is difficult to accurately identify the ideal entry point for the cable. In many cases, this difficulty is due to physical barriers such as beams or roof space dividers or because of the roof construction. These physical barriers may prevent the cable installer from "looking down" the cavity for observable signs of the opening in the wall (for example, light entering into the cavity from via the opening). In such situations, the cable (or weighted draw string) may inadvertently be fed into the cavity from a point that is to the side of the ideal entry point.

It will also be appreciated that from the second location, the cable installer will not be able to readily tell whether the cable has reached the opening. Accordingly, the installer may need to move back and forth between the first and second locations a number of times, before the cable is successfully passed through the cavity, captured and pulled through the opening.

If the cable installer is unable to locate the cable end at the first location (for example, because it has not been fed into the wall cavity correctly), the cable installer may be forced to return to the second position to manipulate the cable.

The above described process is inefficient, and although the efficiency may be improved by using two people to perform the installation, there would be an advantage if a single cable installer was able to be guided to the correct entry point and, during the process of lowering the cable end, be able to detect when the cable end has reached the opening.

The discussion of background to the invention herein is included to explain the context of the invention. This is not to be taken as an admission that any of the material referred to was published, known or part of the common general knowledge in Australia.

SUMMARY OF THE INVENTION

The present invention provides a tool for installing an object, such as a cable, into a cavity region. In broad terms, the present invention is directed to a tool which provides a visual indication of a suitable entry point for lowering an object into a cavity region and a capturing means for capturing the object after it has been lowered into the cavity region.

In its most general form, the tool includes a body, a capturing means, and an identifying means. The capturing means and the identifying means are carried by a part of the body arranged to allow at least the capturing means and the identifying means to be inserted through an opening into the cavity region, and upon capturing the object, allow it to be retracted from the opening together with the captured object.

The tool may be particularly suited for installing objects such as cables, or objects which are attached (or attachable) to cables, chains, lines, conduit and channelling. Accordingly, the present invention provides a tool for installing an object into a cavity region, including:

(a) an identifying means for providing a visual indication of an entry point for lowering the object into the cavity region, said entry point being relative to an opening in the cavity region;

(b) a capturing means for capturing the object after said object has been lowered into the cavity region from said entry point, said capturing allowing the object to be retracted through the opening; and (c) a body;

wherein the identifying means and the capturing means are carried by a part of the body arranged to allow at least the identifying means and the capturing means to be inserted into said cavity region through said opening.

The capturing means may be any component which is suitable for capturing the object. Ideally, the capturing means secures the captured object, or a device attached (or attachable) thereto, with sufficient force to enable the end of the object to be extracted from the cavity through the opening and into an external region by retracting the part of the body from the cavity.

In cases where the object is magnetic, one suitable capturing means may be a magnet, such as a permanent magnet. Alternatively, the magnet may be an electromagnet. Preferably, the magnetic field strength of the electromagnet may be varied using a suitable field control means.

Where the tool includes capturing means which includes a magnet, the capturing means is preferably able to generate a magnetic field that is suitable for establishing a zone of influence in which the field strength is suitable for attracting a material having a magnetic susceptibility. Such a material may form a part of the object itself or it may be attached to an end thereof in the form of a device. Such a device may be initially fed through the cavity. It is preferred that the magnetic field strength of the capturing means be sufficient for securing the material against the part of the body.

In yet another alternative embodiment of the invention, the capturing means may be implemented using a mechanical device having a geometry which is suitable for capturing the object. One suitable mechanical device may be a loop having an inside diameter which is greater than the diameter of the object.

In yet another embodiment of the invention, the capturing means may be a material which is applied to an external surface of the part of the body of the tool which is inserted into the cavity. For example, the material may be a hook or loop type fastener which is able to positively engage with a complementary material attached to the end of the object.

The capturing means may also further include a mechanical gripping means (such as a pawl or a hook) which is preferably located on the end of the part of the body. The mechanical grip may be manipulable (for example, by rotating the body about its longitudinal axis) to positively engage the object or device.

Preferably, the identifying means includes a light source or the like arranged to provide, in a remote region (for example, a roof space), a visible indication of the relative position of the opening. Typically, the remote region would be located substantially vertically above the opening. In this way, the light source or the like is arranged so that an installer located in the remote region can view the visible indication provided by the light source, and thus determine an accurate entry point for lowering the object into the cavity region.

In one form of the invention, the identifying means may be a laser source. The laser source is preferably located on the body so that in use it is able to emit a laser output which is directed to a remote surface (for example, the underside of a roofing surface) located in the region.

Preferably, the tool includes a beam modifying device (such as a lens arrangement) which is able to modify the laser output of the cabling tool. In a preferred form of the invention the beam modifying device is adjustable such that the focus of the laser output onto the remote surface is able to be adjusted.

In one form of the invention, the beam modifying device is a prism which is supported on, or within, the body such that it lies in the path of the output of the light source (or the like) and is mounted to thereby provide an output having different characteristics to the light provided by the light source.

In one form of the invention, the prism is mounted using an arrangement which allows the prism to freely, or partially, rotate about the longitudinal axis of the body. Preferably, the prism is biased so that a face of the prism from which the output projects directs the output in a substantially vertical direction when the body of the cabling tool is aligned in a substantially horizontal plane.

In yet another embodiment of the invention, the tool further includes a sensing means and an alarm means, the sensing means also being arranged on the part of the body which is able to be inserted through an opening in the cavity region. In this form of the invention, the capturing means and the alarm means cooperate such that the sensing means provides a sensed signal in response to the object being captured by the capturing means.

The sensing means may be any device which is suitable for sensing the capturing of the object and providing the sensed signal.

In one form of the invention, the sensing means may include a plurality of electrical contacts arranged on the surface(s) of the part of the body. The contacts may be grouped into sets with different sets being suitably connected to a respective node. The plurality of contacts are preferably arranged so that when the object is captured by the capturing device, a conducting part of, or attached to the object, touches contacts connected to different nodes to thereby complete an electrical circuit between them. In this case, the completion of the electrical signal provides the sensed signal.

In another embodiment of the invention, the sensing means may include a pair of conductors which have been wound around the part of the body so that they are substantially parallel and spaced apart. It is preferred that the winding has a helical geometry which spans across the length of the part of the body.

In yet another embodiment of the invention, the sensing means may include light transmitters (for example, an LED) and receivers (for example, an LED detector) oppositely arranged such that when a cable is captured by the capturing means, light from the light transmitter is obstructed from reaching the light receiver. In this form of the invention, the sensing means includes sensing electronics suitable for detecting the obstruction, and acting on the obstruction to provide the sensed signal.

In yet another embodiment of the invention the sensing means may include a component which, in response to capturing the object, or device(s) attached thereto, changes a frequency of an oscillator circuit. For example, the sensing means may be formed using a resistance, capacitance or inductance sensor which may be a component of an oscillator circuit of the tool. In this form of the invention, an additional circuit may detect the change in the frequency and in response generate the sensed signal.

In yet another embodiment of the invention, the sensing means may be a Hall effect sensor.

The alarm means may provide an alarm signal in response to the sensed signal. In this respect, the alarm means may provide any suitable alarm signal.

The alarm signal may be a visual and/or an audible signal. In a form of the invention which employs a visual alarm signal, the alarm signal may be provided using an indicator (for example, an LED) carried on the body. In this form of the invention, the indicator may be located so as to be is visible from the external region. In an alternative embodiment of the invention, the visual indicator may be mounted on the part of the body which is inserted into the cavity.

In one form of the invention, the identifying means (for example, a light source or the like) may also be used as the alarm means. Indeed, in one form of the invention, where the identifying means is a light source which is also capable of acting as the alarm means, the light source may be controlled so as to modulate (that is, switch 'on' and 'off') the light source to thereby provide an alarm signal.

Typically, at least one wall would define the cavity region. It is preferred that the body of the tool includes, or is attachable to, a mounting arrangement which allows the tool to be secured relative to the wall to thereby rigidly locate at least the capturing means and the sensing means in the cavity.

The mounting arrangement may include a mounting bracket which is suitable for securing the tool to the wall or to a bracket previously attached to the wall. The previously attached bracket may be, for example, a switch bracket or power point plate.

It is also preferred that the mounting arrangement include a rotatable coupling such that the tool is able to rotate about its longitudinal axis relative to the mounting arrangement. The rotatable coupling may also allow the body to pivot about the coupling such that the capturing means and the identifying means may be raised or lowered relative to the mounting arrangement.

In a preferred form of the tool there is also provided an angle indicator means arranged to display the angular orientation of the body with respect to the horizontal plane and about the longitudinal axis of the body. Advantageously, the angle indicator means allows the cabling tool to be secured relative to the wall so that the identifying means is able to emit an output in a substantially vertical direction.

It is to be appreciated that although the invention has been described in terms of a device, the invention also includes a process of installing objects into a cavity region. Therefore, the present invention also provides a process for installing objects into a cavity region, the process including the steps of:
(a) securing part of a tool to an opening in a cavity region, the part of the tool having:
  i. an identifying means, the identifying means being capable of projecting a visible indication onto a surface substantially directly above the opening; and
  ii. a capturing means;
(b) using the tool to project the visible indication onto the surface;
(c) detecting the projected visible indication from a region above the opening;
(d) lowering the object from the region and into the cavity region, such that the object is lowered into the cavity region from an entry point identified by the visible indication;
(e) capturing the object using the capturing means; and
(f) retracting the tool from the opening together with the object.

In its most preferred form the present invention is used for installing a cable into an cavity region. Accordingly, the present invention also provides a tool for installing a cable into a cavity region, including:
(a) an identifying means for providing a visual indication of an entry point for lowering a device which is attached, or attachable to a cable, into the cavity region, said entry point being relative to an opening in the cavity region;
(b) a capturing means for capturing the device after said device has been lowered into the cavity region from said entry point, said capturing allowing the cable to be retracted through the opening; and
(c) a body;

wherein the identifying means and the capturing means are carried by a part of the body arranged to allow at least the identifying means and the capturing means to be inserted into said cavity region through said opening.

It is to be understood that whilst the process has been described in terms of a tool for installing an object (such as a cable), it is envisaged that the invention would also be applicable to installing, or feeding, other items through the cavity. For example, the tool and process may also be used to feed a weighted draw string down a cavity. In such an example, the weighted draw string may ultimately be used to "pull" a cable through the cavity. Accordingly, the present invention also provides a tool for installing a cable into a cavity region, including:
(a) an identifying means for providing a visual indication of an entry point for lowering a device which is attached, or attachable to a cable, into the cavity region, said entry point being relative to an opening in the cavity region;
(b) a capturing means for capturing the device after said device has been lowered into the cavity region from said entry point, said capturing allowing the cable to be retracted through the opening; and
(c) a body;

wherein the identifying means and the capturing means are carried by a part of the body arranged to allow at least the identifying means and the capturing means to be inserted into said cavity region through said opening.

Moreover, whilst it is envisaged that the present invention will find particular application in the area of installation of objects such as power cables and data cables (including electrical and fibre optic data cables), the present invention may also find application in the installation of pipes, conduit and different types of channelling.

BRIEF DESCRIPTION OF THE INVENTION

The present invention will now be described in relation to various embodiments illustrated in the accompanying drawings. However, it must be appreciated that the following description is not to limit the generality of the above description.

In the drawings:

FIGS. 7-A to 7-C shows the cabling tool of FIG. 1 with the identifying means of FIG. 5 in an example application;

FIGS. 12-A to 12-D shows an example application of the preferred embodiment of FIG. 6.

DETAILED DESCRIPTION OF THE INVENTION

First Preferred Embodiment of the Invention

Figure 1:
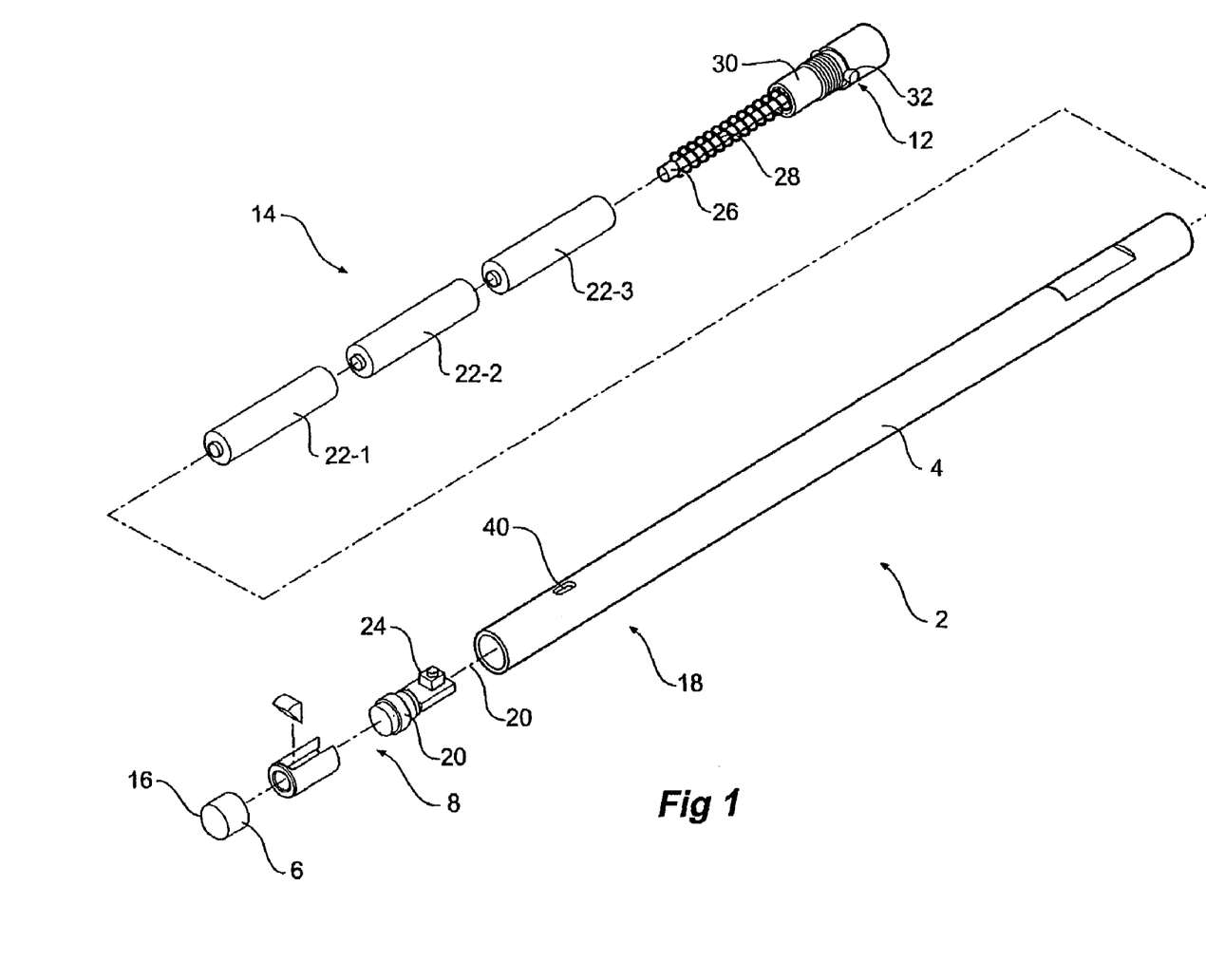
FIG. 1 shows an exploded view of a cabling tool according to a first preferred embodiment of the present invention.
Figure 2:
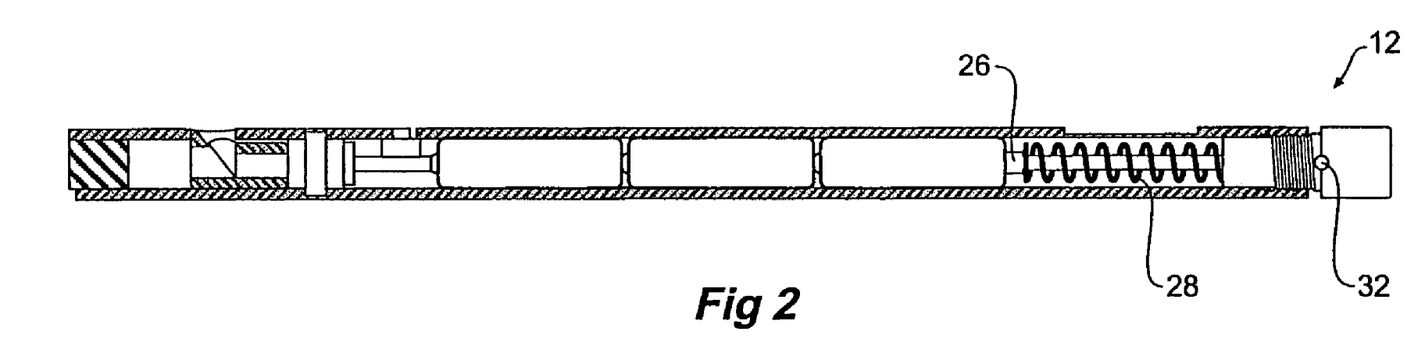
FIG. 2 shows a sectional view of the cabling tool of FIG. 1 with the identifying means in an off-state.
Figure 3:
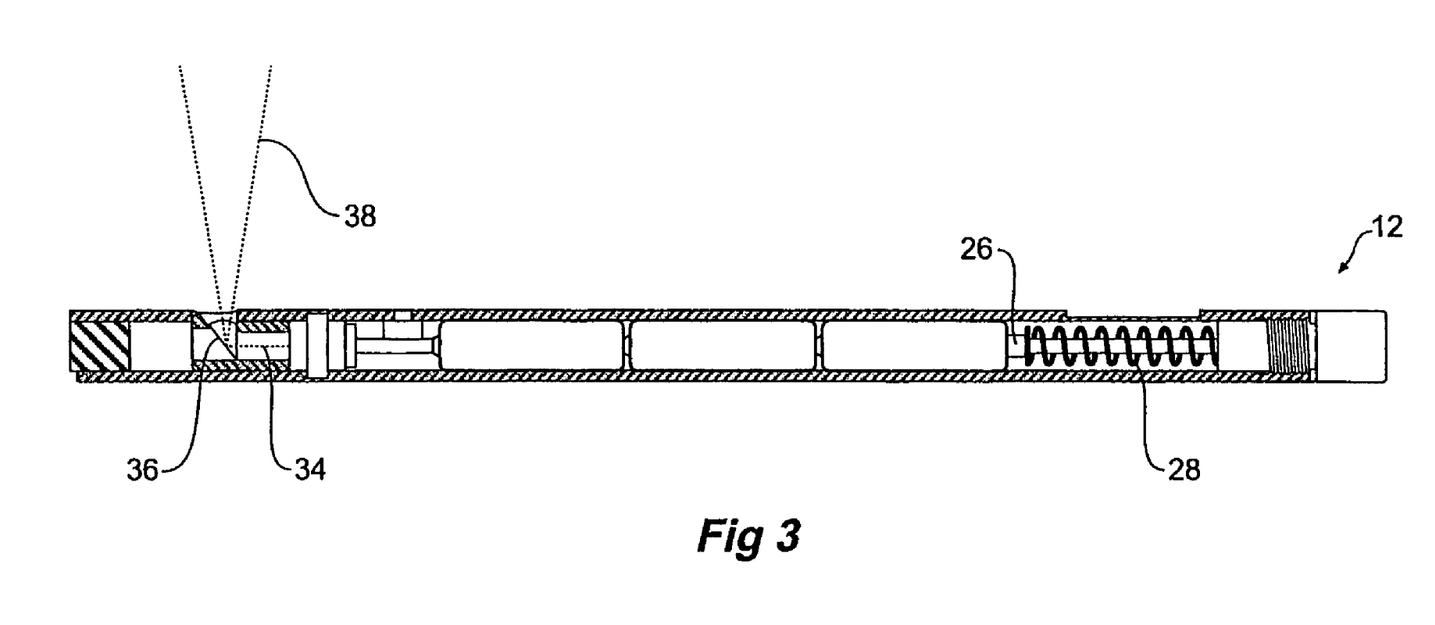
FIG. 3 shows a sectional view of the cabling tool of FIG. 1 with the identifying means in an on-state.

In FIGS. 1, 2 and 3 there is shown a cabling tool 2 according to a first preferred embodiment of the present invention.

According to the first preferred embodiment of the invention, the cabling tool 2 includes a body 4, a capturing means 6, an identifying means 8 (in the form of a laser source 10, a lens 11 and lens housing 13), an 'on-off' switch 12, and a DC voltage source 14.

The capturing means 6, and the laser source 10 are carried by a part 18 of the body 4 constructed and arranged to be inserted through an opening in a wall bounding a cavity region. In the first preferred embodiment of the invention the body 4 is constructed of a conductive cylindrical extrusion.

In the preferred embodiment of the invention, the capturing means 6 includes one or more permanent magnets 16 which are housed within the body 4. The permanent magnet(s) 16 have a construction which is suitable for providing a magnetic field in a zone surrounding the part 18 of the body 4 which is inserted into the opening in the cavity. In this way, the magnetic field exerts a magnetic force on any materials having a magnetic susceptibility which are located in the field, to thereby attract them towards the capturing means 6 and thus the body 4.

In the present case, the capturing means 16 shown in FIGS. 1 to 3 is a permanent magnet 16 which is arranged towards an end of the body 4, and is thus arranged adjacently to the identifying means 8. However, the lens housing 13 may itself be the permanent magnet, in which case the lens 11 component of the identifying means 8 may be seated in the capturing means. Advantageously, this form of the invention would result in the identifying means 8 being arranged closer to the end of the body 4. Such an arrangement may be particularly well suited for narrow cavity regions.

In the first preferred embodiment of the invention, the laser source 10 (which in the preferred form is a laser diode) is able to provide a laser output having a wavelength within the visible part of the spectrum.

It is envisaged that a suitable laser diode 10 may be a Helium Neon (HeNe) laser diode having a wavelength selected from 635 nm, 670 nm or 780 nm. It is also envisaged that a typical output power of approximately 1 mW to 5 mW would be suitable.

As is illustrated, the laser diode 10 is located at the distal end of the body 4 and mounted so as to be aligned with the longitudinal axis 20 of the body 4.

In the first preferred embodiment, the DC voltage source 14 includes plural batteries 22-1, 22-2, 22-3 having suitable supply characteristics. Preferably, the batteries 22-1, 22-2, 22-3 are located within an internal compartment of the body 4. The internal compartment also includes contacts 24, 26 that are able to provide an electrical connection to a terminal of each of batteries 22-1 and 22-3 respectively. It will be appreciated that although the first preferred embodiment of the invention will be described in terms of a tool which includes three batteries 22-1, 22-2, 22-3, any suitable number of batteries may be used.

More specifically, contact 26 is connected to a first terminal of the battery 22-3 as well as a conductive element 28 (for example, a rod) of on-off switch 12. On the other hand, contact 24 connects a first terminal of the laser source 10 to a first terminal of battery 22-1.

In the first preferred embodiment of the invention the on-off switch 12 is provided by way of a threaded end-piece 30 having a bore through which conductive element 28 passes so as to make electrical contact with conductive tabs 32.

As is shown in FIG. 3, when the switch 12 is in the 'closed' position (that is when the threaded end-piece is rotated such that the conductive tabs 32 makes contact with the end of the body 4) an electrical circuit is completed between the contact 26 and body 4 which in turn applies the DC supply provided by the series combination of batteries 22-1, 22-2, 22-3 across the laser source 10 via a metal housing 25 of the laser source and using contact 24.

When the on-off switch 12 is in the 'on' position the laser source 10 is excited and thus emits a laser output 34.

Although the on-off switch 12 has been described in terms of a threaded type assembly it will be understood that any suitable electrical switch may be used.

The output 34 of the laser 10 is directed onto beam modifying device 36 which reflects the laser output 34 ('the incident beam') which is incident on it. More particularly, the beam modifying device 36 reflects the incident beam 34 such that a reflected beam 38 is directed through an opening 40 (such as a slot) in the body 4.

The beam modifying device 36 may be a mirror which is supported within the body. Alternatively, the beam modifying device 36 may be a prism which provides a reflected beam 38 having a different pattern to the incident beam.

Figure 4:
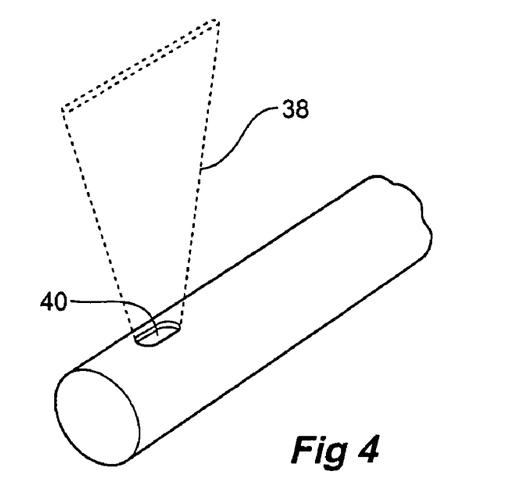
FIG. 4 shows a preferred form of a visible indication suitable for use with the cabling tool of FIG. 1.
Figure 5:
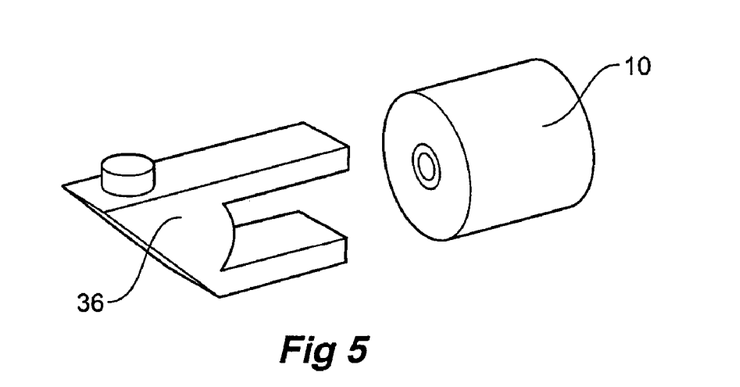
FIG. 5 shows a preferred arrangement of an identifying means suitable for use with the cabling tool of FIG. 1.
Figure 6:
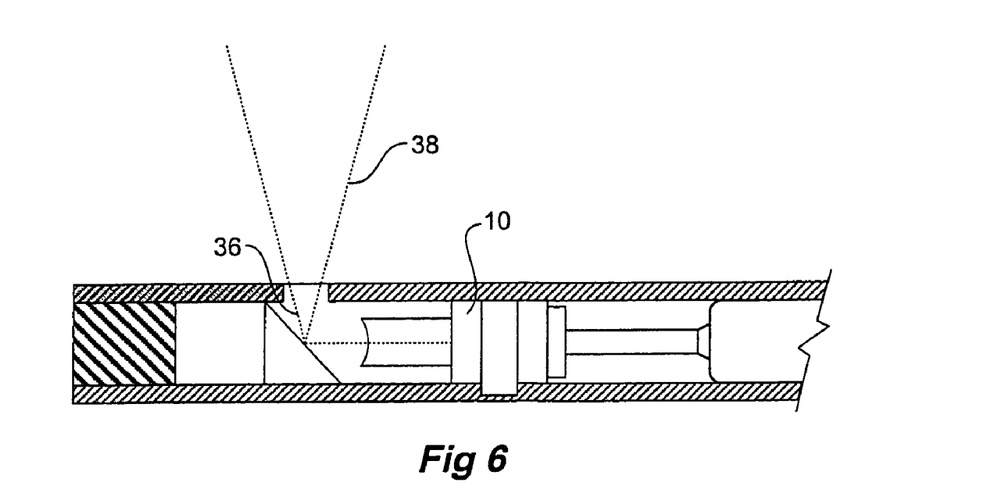
FIG. 6 shows a sectional view of the cabling tool of FIG. 1 with the identifying means of FIG. 5.

Referring now to FIGS. 4, 5 and 6, where the beam modifying device 36 includes a prism, the reflected beam 38, and thus the beam which is emitted from the body 4 via opening 40, may be dispersed along the longitudinal axis 20 of the body 4 (as opposed to a typical laser 'spot' output) to thereby provide a 'spreading line' type output 38.

Figure 7:
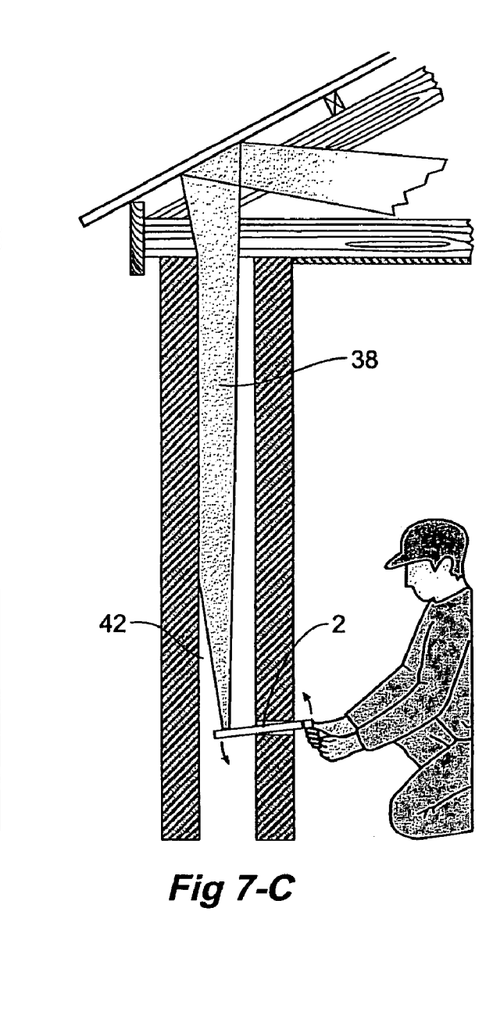

As is shown in FIGS. 7-A, 7-B and 7-C, the 'spreading line' type output provides the cabling tool 2 with a number of advantages. For example, as is shown in FIG. 7-A, in circumstances where an obstacle would otherwise block, or restrict, the path of a 'spot' type output, at least a portion of the spreading line type output may still be able to pass the obstacle and thus project up the cavity 42.

Furthermore, in circumstances where the walls which bound the cavity 42 are uneven, such as is shown in FIG. 7-B, a portion of the 'spreading line' type output may still be able to project up the cavity 42.

Furthermore, the 'spreading line' type output also means that the horizontal alignment of the cabling tool 2 is not as critical as may be the case for a 'spot' type output. Here also, and as is shown in FIG. 7-C, a spreading line type output provides an increased range of movement and is thus more tolerant of variations in horizontal alignment.

Having described a first preferred embodiment of the invention, the description will now turn to a second preferred embodiment of the invention.

Second Preferred Embodiment

Figure 8:
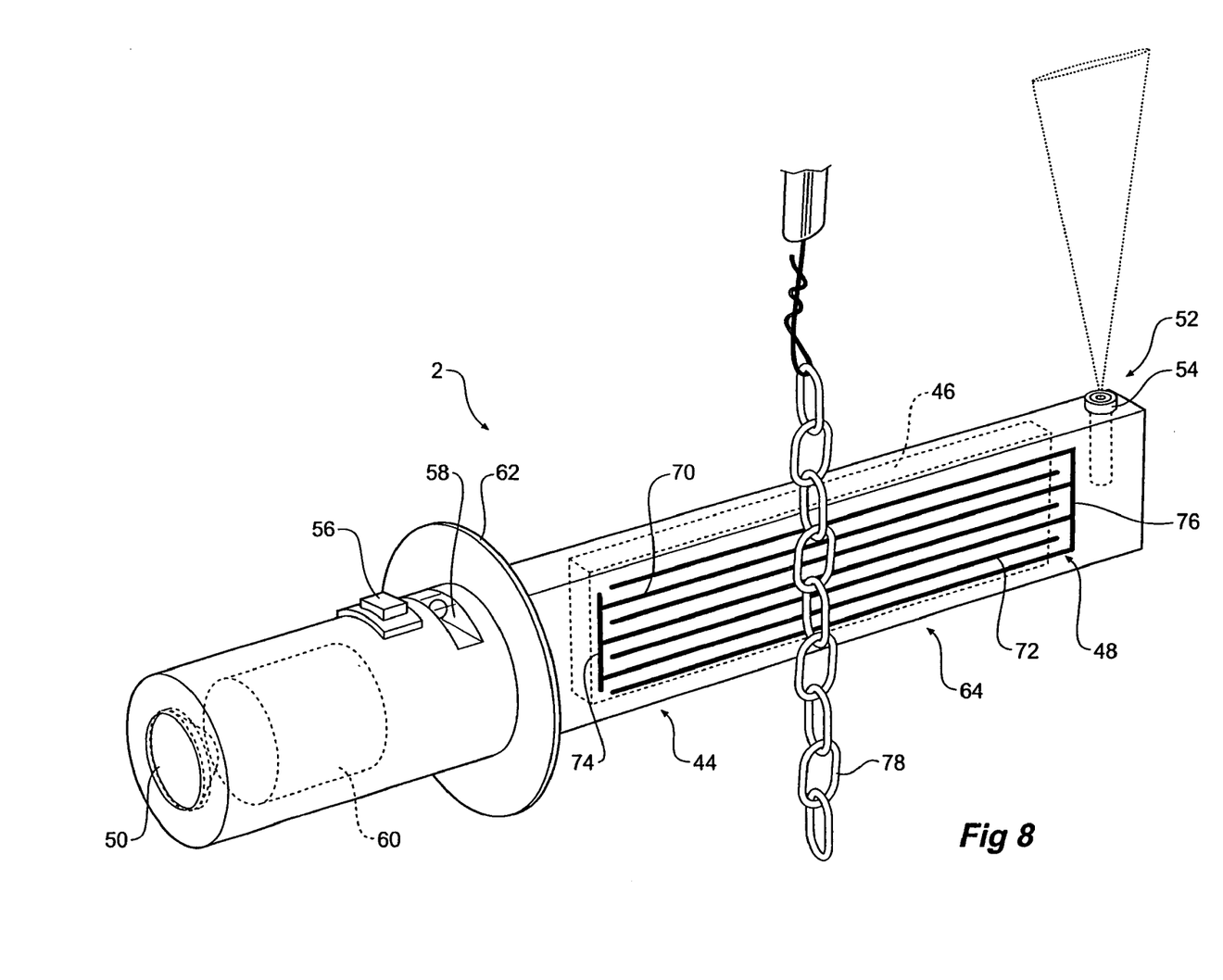
FIG. 8 shows perspective view of a second preferred embodiment of the present invention.

Turning to FIG. 8 there is shown a second preferred embodiment of the invention. Here, the cabling tool 2 includes a body 44, a capturing means 46 (shown in a cut-away view), a sensing means 48, an alarm means 50, an identifying means 52 in the form of a laser source 54, an 'on/off switch' 56, an angle orientation indicator 58 and a DC voltage source 60.

The second preferred embodiment as illustrated also includes a mounting arrangement in the form of a bracket 62.

The sensing means 48, the capturing means 46, and the laser source 54 are carried by a part 64 of the body 44 constructed and arranged to be inserted through an opening in a wall bounding a cavity region. Indeed, the part 64 of the body 44 is preferably shaped in the form of an elongated section having a length which is suitable for allowing it to be inserted into the cavity region located behind the opening so as to substantially span across the cavity.

According to the second preferred embodiment of the invention, the capturing means 46 is a permanent magnet which is housed within the body 44. The permanent magnet 46 has a construction which is suitable for providing a magnetic field in a zone which surrounds the part of the body 64. In this way, the magnetic field is able to exert a magnetic force on any materials having a magnetic susceptibility which are located in the field, to thereby attract them towards the sensing means 48.

Although the capturing means 6, 46 has been described in terms of a permanent magnet, it is to be understood that the capturing means 6, 46 may also be implemented using other suitable means. For example, in one form of the invention the capturing means 6, 46 may be an electromagnet (for example, an energised coil) that is able to generate the magnetic field electrically.

Figure 10:
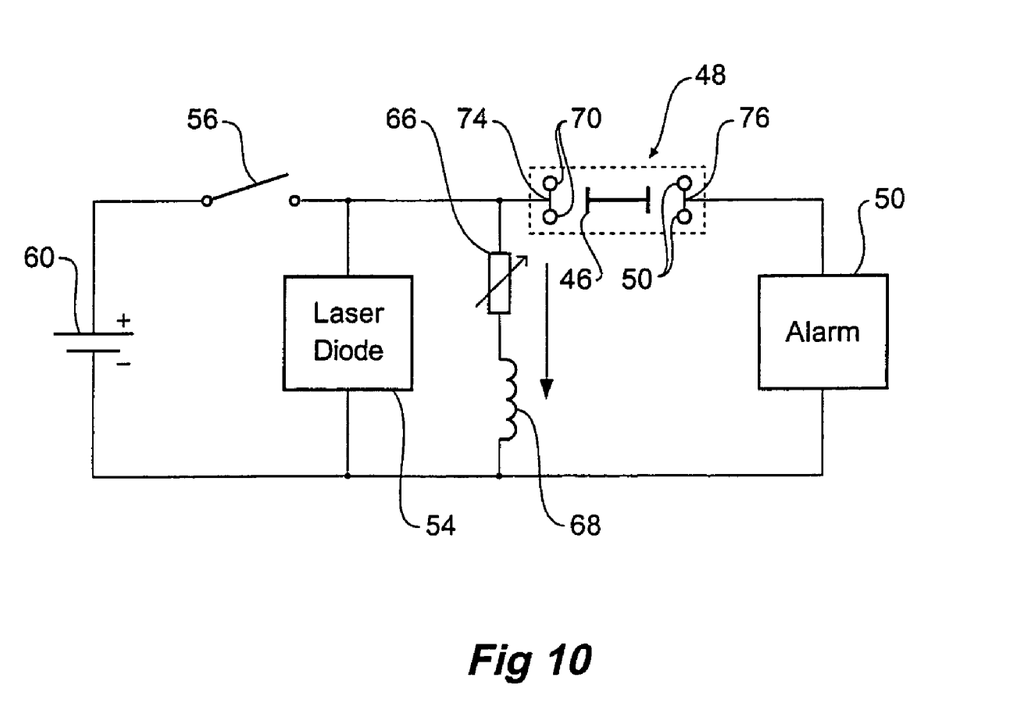
FIG. 10 shows a simplified schematic diagram of a first alternative embodiment of the second preferred embodiment of FIG. 6.

In terms of the second preferred embodiment of the invention, one form of an embodiment having an electromagnet 66 is shown in FIG. 10. Here, the strength of the magnetic field generated by the capturing means 46 is able to be controlled by a potentiometer 68. In this form of the invention, the current (I) through the electromagnet 66 is varied by varying the magnitude of the resistance provided by the potentiometer 68 to thereby vary the magnetic field strength. Ideally, the resistance of the potentiometer 66 will be able to be varied using a user accessible control (not shown) attached to a control shaft (not shown) of the potentiometer.

Returning to FIG. 8, the sensing means 48 of the second preferred embodiment includes a plurality of contacts 70, 72 located on opposite surfaces of the body part 64. On each surface, the contacts are arranged in sets such that a first set of contacts 70 are electrically connected to a first node 74, and a second set of contacts 72 are electrically connected to a second node 76.

In the preferred embodiment of the invention, the set of contacts 70, 72 are thin strips of conductive material (for example, tin plated copper) which are applied to opposite surface(s) of the body 64. The conductive strips of each contact set 70, 72 are arranged in parallel and interleaved such that contacts from the different sets 70, 72 are adjacently located and spaced apart.

In the second preferred embodiment, the voltage source 60 is a DC voltage source. The DC voltage source may be a battery having suitable supply characteristics. In the second preferred embodiment of the invention, the battery 60 is located within a compartment in the body 44. The compartment includes connectors (not shown) that are able to provide an electrical connection to the battery terminals (not shown). In this respect, although the voltage source for both the first preferred embodiment and the second preferred embodiment of the invention has been described in terms of a DC voltage source, it will be appreciated that an AC voltage source may also be used.

Figure 9:
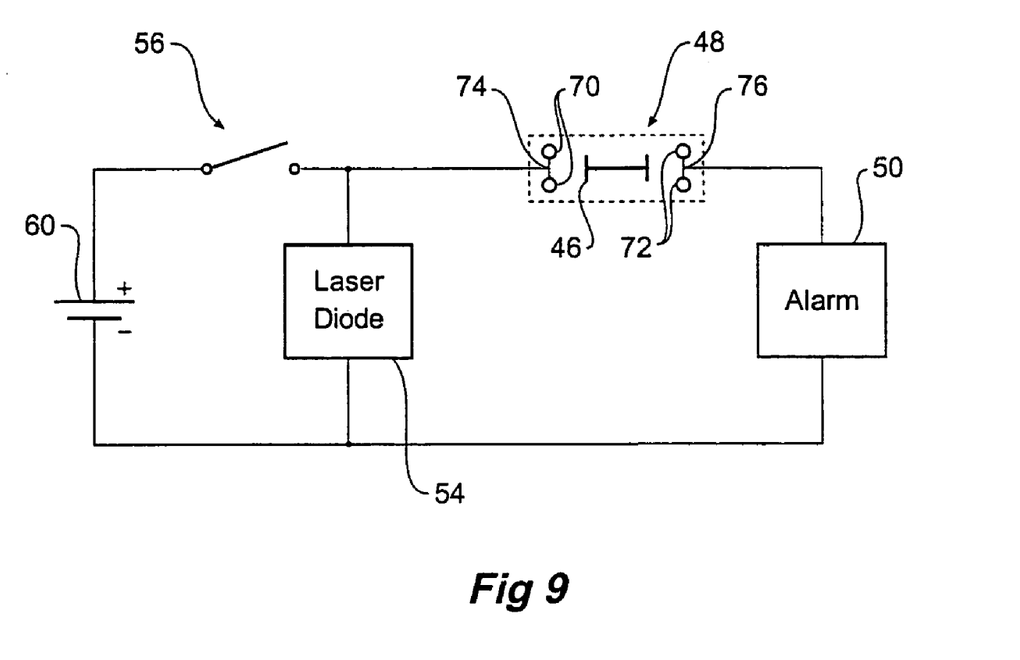
FIG. 9 shows a simplified schematic diagram suitable for the second preferred embodiment of FIG. 6.

In a form of the second embodiment of the invention which uses a permanent magnet, and as is illustrated in FIG. 9, the first node 74 is connectable to a first terminal (that is, the positive terminal) of the battery 60 by the actuation (that is, closing) of on/off switch 56, and the second node 76 is connected to a first terminal of the alarm 50. A second terminal of the alarm 50 is connected to a second terminal (that is, the negative terminal) of the battery 60. Thus, as is evident from inspection of FIG. 9, when the switch 12 is in the "closed" position, and a low resistance path exists (as is the case, for example, when the chain (ref. FIG. 8) 78 lies across contacts 70 and 72) between the contacts 70 connected to the first node 74 and the contacts 72 connected to the second node 76, an electrical circuit is established in which the battery 60 is connected across the alarm 50. Thus, in this condition the alarm 50 receives a DC supply from the battery 60 and uses this supply to generate an alarm signal.

Referring again to FIG. 8, the permanent magnet 46 is located within the body 44 and positioned between the surfaces of the body 44 carrying the contacts 70, 72 of the sensing means 32. In this way, the permanent magnet 46 is able to generate a zone of influence (not shown) having a magnetic field that is able to attract materials having a magnetic susceptibly to the contacts of the sensing means 48.

As described previously, the second preferred embodiment of the cabling tool 2 also includes a laser source 54 (which in the preferred form is a laser diode) that is able to provide a laser output having a wavelength within the visible part of the spectrum.

In this respect, it is envisaged that a suitable laser diode 8 may be a Helium Neon (HeNe) laser diode having a wavelength selected from 635 nm, 670 nm or 780 nm. It is also envisaged that a typical output power of approximately 1 mW to 5 mW would be suitable.

As is illustrated, the laser diode 54 is located at the distal end of the body 44 and mounted so as to be perpendicularly aligned with the longitudinal axis of the body 4, and perpendicularly aligned with the longitudinal axis of the angle orientation indicator 58.

In the second preferred embodiment of the invention, the alarm means 50 is a piezoelectric audio indicator that is located at the near end of the body 44. However, it is envisaged that the alarm means 50 may be mounted at the distal end. Indeed, in an embodiment where the alarm means 50 is an audio indicator which is mounted at the distal end, the audio indicator may be able to project an alarm signal in the cavity such that it may be heard by an installer located above the cavity.

It is envisaged that a piezoelectric audio indicator having a sound level of approximately 72 dB would be suitable. The piezoelectric audio indicator may generate an audio signal having a continuous tone or a discontinuous tone.

In use, the capturing means 46 is able to capture a cable 78 or other device (for example, a weighted line), attached or attachable to the cable, which has been lowered into the cavity region. In response to capturing the cable or other device, the sensing means 48 provides a sensing signal which causes the alarm means 50 to activate an alarm signal.

Although the preferred embodiment of the invention has been described in terms of a cabling tool which is able to alert an installer to the capture of a single cable, it is to be appreciated that other embodiments of the invention are possible.

In one alternative embodiment, the cabling tool 2 may provide a separate alarm signal for the capture of each of a plurality of cables. Indeed, in FIG. 11 there is illustrated a more sophisticated implementation of the present invention which employs sensing electronics 80 and multiple pairs of contacts.

Figure 11:
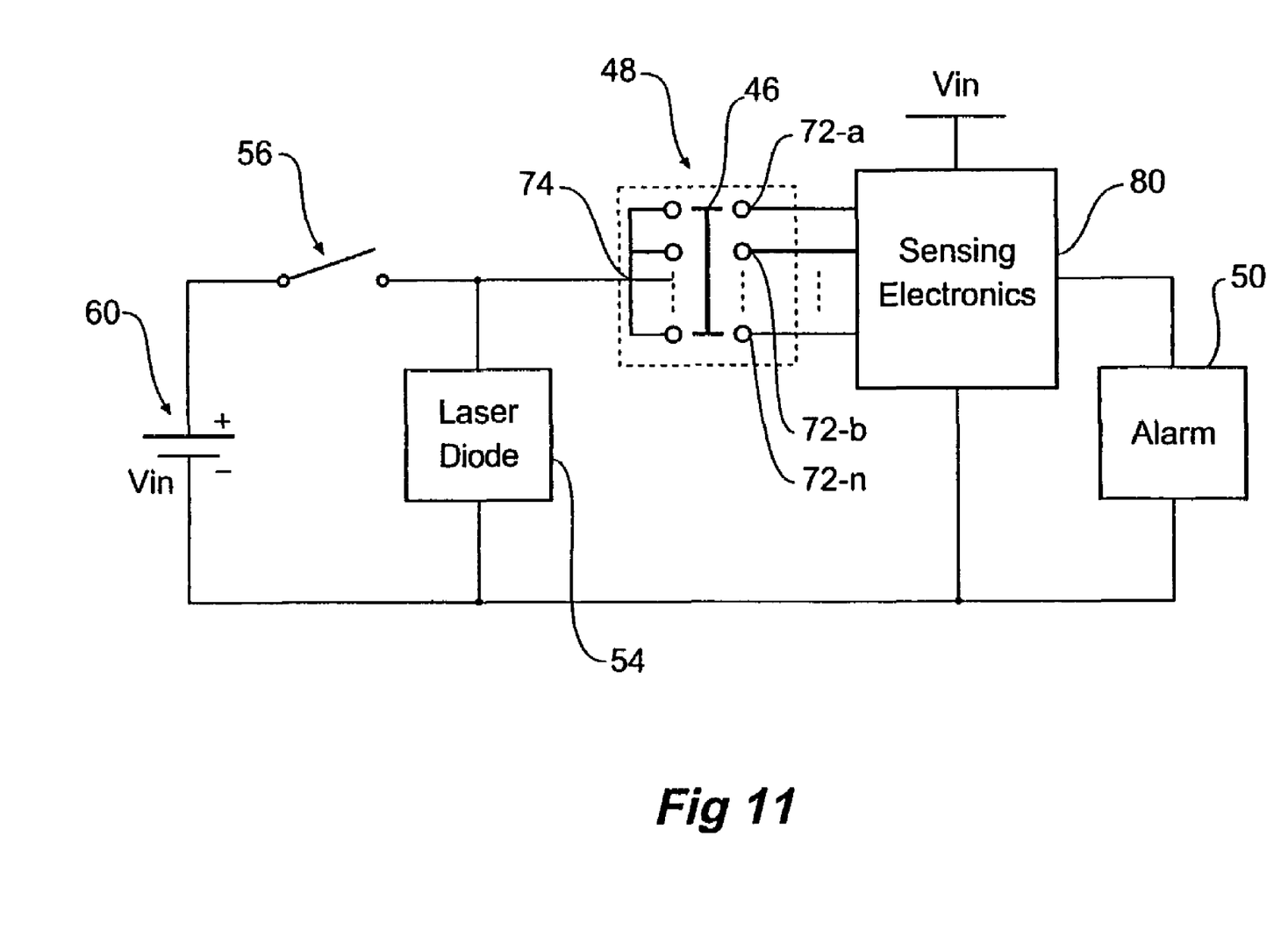
FIG. 11 shows a simplified schematic diagram of a second alternative embodiment of the second preferred embodiment of FIG. 6.

The pairs of contacts are arranged such that one contact of each pair is connected to node 74. The other contact of each pair is connected to a respective node 72-A to 72-n. Each node 72-A to 72-n is connected to a respective input of sensing electronics 80 so that the sensing electronics 80 is able to sense which pair of contacts has been 'shorted' by a captured electrical cable, or device attached thereto.

In this embodiment of the invention, the alarm 50 may generate a different alarm signal as pairs of contacts are 'shorted'. Alternatively, in response to a particular pair of contacts being 'shorted' the alarm signal may activate for a limited duration, after which the alarm 50 may deactivate. Thus, if a pair of contacts is subsequently 'shorted' the alarm 50 may reactivate.

Ideally, the capturing means 46 engages the cable or other device attached thereto, such that a part of the captured cable or device is able to be extracted from the cavity through the opening and into the external region by retracting the body from the cavity.

EXAMPLE 1

Using the Cable Tool

Having described the components of the cabling tool 2, the description will now turn to an example application of the cabling tool 2.

Figure 12:
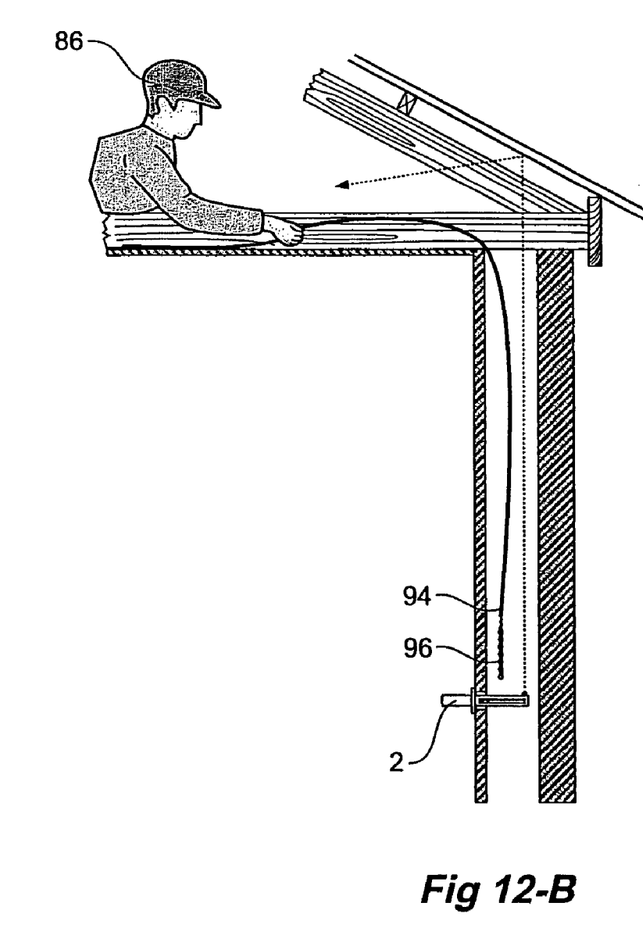

Turning now to FIG. 12 there is illustrated a sequence which depicts an example application of the cabling tool 2. The example application involves using the above-described second preferred embodiment of the cabling tool 2 to assist in the installing/routing of electrical cables to an opening 82 formed in a wall defining a wall cavity 42. As shown in this figure, a roofing structure 84 directly above the cavity 42 is such that it is not possible for an installer 86 to readily locate himself above the cavity 42 to thereby visually locate the opening 82.

At FIG. 12-A the cabling tool 2 is shown inserted into an opening 82 in a wall 85 and fixed relative to the wall 85 using the bracket 62 (ref. FIG. 8). The fixing may involve securing the bracket 62 to an electrical fitting (for example, a mounting plate for a GPO) using suitable fasteners.

The process of fixing the cabling tool 2 relative to the wall 85 entails adjusting the angular orientation of the cabling tool 2 about its longitudinal axis to align the laser diode 54 (ref. FIG. 8) for projecting a laser output in a substantially vertical direction. This process may be performed by adjusting the cabling tool 2 about its longitudinal axis to a position whereby the angular orientation indicator 58 (ref. FIG. 8) indicates that the projection of the laser diode 54 is substantially vertical. Such adjustment may also entail pivoting the cabling tool 2 with respect to the bracket 62.

Referring now to FIG. 8, having fixed the cabling tool 2 relative to the wall, the switch 56 is actuated to connect the battery 60 to laser diode 54 and the first node 74 (ref FIG. 9). Thus, returning to FIG. 13, once the switch 56 (ref FIG. 8) has been actuated, the laser diode 54 (ref FIG. 9) emits a laser output 88 in a substantially vertical direction.

As is shown in FIG. 12-A, the laser output 88 is projected onto a surface 90 remote from the cabling tool 2, such as the surface 90 of an object 92 in the space 84 above the opening 82, so as to form an image thereon. In the illustration of FIG. 12-A, the object 92 is the underside of roofing material (e.g. a roof tile).

The image of the laser output 88 on the roof tile 92 provides a cable installer (for example, an electrician) with a visual indication of a suitable entry point for feeding an electrical cable into the cavity 42. Advantageously, due to the vertical projection of the laser output 88, the indicated entry point is directly above the opening 82 in the wall 85.

As is shown in FIG. 12-B, having identified a suitable entry point, the cable installer 86 is then able to feed an end of cable 94, or other device, into the cavity 42 and commence lowering it. To assist with this process, the installer 86 may attach a weighted object (such as a chain) which is made from a conductive material having a magnetic susceptibly (such as steel) to the cable or other device. Indeed, in FIG. 12-B the electrical cable 94 is shown with an object 96 (which in the preferred embodiment is a steel chain) attached to its end. Advantageously, the weight of chain 64 assists the lowering of the cable 94 into the cavity.

As is shown in FIG. 12-C, once the cable 94 has been lowered to a point where the chain 96 is at the same vertical level as, and in the vicinity of, the cabling tool 2, the magnetic field generated by the permanent magnet 46 (ref. FIG. 8) exerts a force onto the chain which causes the chain 96 to be attracted towards the cabling tool 2. Ideally, the force is sufficient to capture the chain (and thus the cable) so as to secure the chain 96 against the body of the cabling tool 2 to thereby touch the contacts 70, 72 (refer FIG. 8) on the surface of the body 44.

The touching of the chain 96 on the contacts 70, 72 (refer FIG. 8) effectively provides a short circuit path between contacts connected to different electrical nodes 74, 76 (refer FIG. 8).

Referring now to FIG. 8, the short circuit path connects the battery 60 to the alarm 50 and in so doing provides a sensed signal to alarm 50. As is shown in FIG. 12-C, the sensed signal causes the alarm to generate an alarm signal 98 which alerts the cable installer 86 located in space 84. Thus, the installer 86 knows that the cable 94 or other device 96 is properly located and can then leave the roof space 84 and position himself to pull the cable through the opening 82.

In this respect, although the first preferred embodiment was not described as incorporating an alarm, an installer using the first preferred embodiment of the invention may nevertheless detect when the cable (or other device) is properly located. In particular, when the cable (or other device) is captured by the capturing means, the cable will exhibit a different response to manipulation by the installer which will be detectable to the installer.

As is shown at FIG. 12-D, the cable installer 86 is able to remove the cabling tool 2 from the opening 82 in the wall 85, thereby pulling the chain 96 and the end of cable 94 through the opening 82.

Finally, it will be understood that there may be other variations and modifications to the configurations described herein that are also within the scope of the present invention.

The invention claimed is:

1. A tool for installing an object into a cavity region, comprising:
   (a) an identifying means for providing a visual indication of an entry point for lowering the object into the cavity region, said entry point being relative to an opening in the cavity region;
   (b) a capturing means for capturing the object after said object has been lowered into the cavity region from said entry point, said capturing allowing the object to be retracted through the opening;
   (c) a body; and
   (d) an angle indicator means arranged to display the angular orientation of the body with respect to the horizontal plane and about the longitudinal axis of the body;
   wherein the identifying means and the capturing means are carried by a part of the body arranged to allow at least the identifying means and the capturing means to be inserted into said cavity region through said opening.

2. A tool according to claim 1 wherein the object comprises at least one of:
   a cable;
   (b) a device which is attached or attachable to a cable;
   (c) a line;
   (d) a conduit;
   (e) a pipe; or
   (f) a channel.

3. A tool according to claim 1 wherein the identifying means and the capturing means are arranged adjacently.

4. A tool according to claim 1 wherein at least a part of the identifying means is seated in the capturing means.

5. A tool according to claim 1 wherein the capturing means includes a magnet.

6. A tool according to clam 5 wherein the magnet has a variable magnetic field strength.

7. A tool according to claim 1 wherein the capturing means includes a mechanical device having a geometry which allows the capturing means to capture the object.

8. A tool according to claim 7 wherein the mechanical device is a loop having an inside diameter which is greater than the diameter of the object.

9. A tool according to claim 1 wherein the capturing means comprises a material which is applied to an external surface of the part of the body, said material being able to positively engage with a complementary material attached to the object.

10. A tool according to claim 1 wherein the capturing means comprises a mechanical gripping means located on an end of the part of the body.

11. A tool according to claim 1 wherein the identifying means includes a light source.

12. A tool according to claim 11 wherein the light source is a laser.

13. A tool according to claim 11 wherein the light source is a light emitting diode.

14. A tool according to claim 11 wherein the light source is a filament globe.

15. A tool according to claim 11 wherein the identifying means further comprises a beam modifying device, said beam modifying device for modifying the output of the light source so as to thereby provide the visual indication.

16. A tool according to claim 15 wherein the beam modifying device includes a prism.

17. A tool according to claim 15 wherein the visual indication includes:
(a) a spreading line; or
(b) a spot.

18. A tool according to claim 15 wherein the beam modifying device is mounted using an arrangement which allows the beam modifying device to freely, or partially, rotate about the longitudinal axis of the body, the device being biased so as to project the visual indication in a substantially vertical direction when the body of the cabling tool is aligned in a substantially horizontal plant.

19. A tool according to claim 1, further comprising:
(a) a sensing means for sensing the capturing of the object and providing a sensed signal in response thereto; and
(b) an alarm means for providing an alarm signal in response to the sensed signal.

20. A tool according to claim 19 wherein the sensing means comprises a plurality of contacts arranged on a surface of the part of the body, said contacts being arranged so that in response to the capturing of a conductive object an electrical current path is formed between at least two of the contacts, said current path completing an electrical circuit which causes the sensed signal.

21. A tool according to claim 19 wherein the sensing means comprises a pair of conductors which have been wound around the part of the body so that they are substantially parallel and spaced apart.

22. A tool according to claim 19 wherein said sensing means comprises optical sensors for sensing the capturing of the object.

23. A tool according to claim 19 wherein said sensing means comprises a component which is responsive to the capturing of the object so as to change a frequency of an oscillator circuit, said change in frequency causing the sensed signal.

24. A tool according to claim 19 wherein the sensing means is a Hall effect sensor.

25. A tool according to claim 19 wherein the alarm signal is a visual alarm signal.

26. A tool according to claim 25 wherein the alarm means comprises the identifying means and wherein the alarm signal is provided by modulating the visible indication provided by the identifying means.

27. A tool according to claim 1 further including a mounting arrangement which allows the cabling tool to be secured relative to the opening to thereby rigidly locate the part of the body in the cavity.

28. A tool according to claim 27 wherein the mounting arrangement includes a rotatable coupling such that the tool is able to rotate about its longitudinal axis relative to the mounting arrangement.

* * * * *